United States Patent
Xu et al.

(10) Patent No.: US 12,524,526 B2
(45) Date of Patent: Jan. 13, 2026

(54) CLUSTERING-BASED ADAPTIVE ROBUST COLLABORATIVE LEARNING METHOD AND APPARATUS

(71) Applicant: TSINGHUA UNIVERSITY, Beijing (CN)

(72) Inventors: Ke Xu, Beijing (CN); Yi Zhao, Beijing (CN); Jiahua Chen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 280 days.

(21) Appl. No.: 18/353,993

(22) Filed: Jul. 18, 2023

(65) Prior Publication Data
US 2024/0020380 A1    Jan. 18, 2024

(30) Foreign Application Priority Data
Jul. 18, 2022 (CN) .......................... 202210843405.6

(51) Int. Cl.
*G06F 21/00* (2013.01)
*G06F 21/55* (2013.01)
*G06F 21/57* (2013.01)

(52) U.S. Cl.
CPC .............. *G06F 21/55* (2013.01); *G06F 21/57* (2013.01)

(58) Field of Classification Search
CPC .................................. G06F 21/57; G06F 21/55
USPC ......................................................... 726/23
See application file for complete search history.

(56) References Cited

U.S. PATENT DOCUMENTS

| | | | | |
|---|---|---|---|---|
| 2018/0018590 | A1* | 1/2018 | Szeto | G16H 10/60 |
| 2020/0027009 | A1* | 1/2020 | Khan | G06N 7/01 |
| 2024/0039983 | A1* | 2/2024 | Jing | H04L 67/10 |
| 2025/0053664 | A1* | 2/2025 | Cameron | G06F 21/552 |

FOREIGN PATENT DOCUMENTS

CN    114758784    7/2022

OTHER PUBLICATIONS

CNIPA, First Office Action for CN Application No. 202210843405.6, Sep. 7, 2022.

* cited by examiner

*Primary Examiner* — Josnel Jeudy
(74) *Attorney, Agent, or Firm* — Hodgson Russ LLP

(57) ABSTRACT

A clustering-based adaptive robust collaborative learning method includes: local models uploaded by a plurality of collaborative terminals and at least part of training data of the plurality of the collaborative terminals for training the local models are obtained, a trusted global model is trained based on the at least part of the training data; by taking trusted global model parameters as a trust guidance, a clustering operation is performed on each parameter dimension of the local models based on a predetermined optimal clustering algorithm respectively; and weights of the trusted local model parameters are determined based on similarities between the trusted global model parameters and the trusted local model parameters, to update the trusted global model parameters.

9 Claims, 2 Drawing Sheets

CLUSTERING-BASED ADAPTIVE ROBUST COLLABORATIVE LEARNING METHOD AND APPARATUS

CROSS-REFERENCE TO RELATED APPLICATION

The present application claims priority to Chinese Patent Application No. 202210843405.6, filed on Jul. 18, 2022, the entire disclosure of which is incorporated herein by reference.

TECHNICAL FIELD

The present disclosure relates to the technical field of collaborative learning security in intelligent collaboration, and in particular, to a clustering-based adaptive robust collaborative learning method and apparatus.

BACKGROUND

With popularization and application of machine learning models in numerous application fields such as malicious traffic detection, intelligent congestion control, and unmanned vehicles, influence of data on model performance is more and more important, and whether reliable high-quality data can be collected becomes an important factor that restricts performance of the machine learning model. In practical application scenarios, data exists in a form of "data islands" between various industries, organizations, or even departments of a same company for security and privacy considerations. This greatly limits the wide deployment and application of the machine learning model in real life.

Therefore, collaborative learning may enable data of a plurality of organizations (or devices, or individuals) to participate in a collaborative learning process together on the basis of ensuring data privacy, so as to obtain a global model capable of adapting to various data. In particular, collaborative learning involves a plurality of collaborators, each collaborator trains a local model with locally owned data. These local models may be aggregated by a central server, or may be aggregated in a peer to peer (P2P) form, etc. An aggregated model is referred to as a global model. Then, the global model is distributed to all collaborators, and the collaborators continue to retrain a collaboration model on the basis of the global model by using respective local data. In this way, iteration is performed until the global model converges. As a distributed intelligent collaborative framework, the collaborative learning not only solves the problem of data islands, but also alleviates pressure of computing resources and network transmission compared with a traditional centralized learning method.

However, new technique can bring new problems. Although the collaborative learning solves the problem of data islands, it is difficult for the central server (or a specific collaborator that initiates an aggregation operation) to monitor a training process of each collaborator for the protection of the privacy of each collaborator. Therefore, some malicious attackers can generate malicious behaviors by participating in the training process of the collaborative learning or controlling a benign collaborator in the collaborative learning, and make the trained global model unavailable (or with security vulnerabilities) through data poisoning. Specifically, adversarial attacks such as poisoning attacks, backdoor attacks and the like are often implemented in a manner of tampering with a dataset. A model obtained by training with a tampered dataset by a malicious attacker (or a collaborator controlled by the malicious attacker) is referred to as a malicious model (or a local malicious model), and a model obtained by a benign collaborator using a local dataset without any malicious data tampering for training is referred to as a benign model (or a local benign model). Once the malicious model is aggregated with other benign models to form a new global model in an aggregation stage, it means that the subsequent global model and the benign models encounter the adversarial attack, which will lose original capability (such as high accuracy). That is, the robustness of the model is lost.

SUMMARY

A clustering-based adaptive robust collaborative learning method is proposed according to an embodiment of the present disclosure, and includes:
  obtaining local models uploaded by a plurality of collaborative terminals and at least part of training data of the plurality of the collaborative terminals for training the local models, and training a trusted global model based on the at least part of the training data;
  by taking trusted global model parameters of the trusted global model as a trust guidance, performing a clustering operation on each parameter dimension of the local models based on a predetermined optimal clustering algorithm respectively, and obtaining trusted local models and trusted local model parameters of the trusted local models; and
  determining weights of the trusted local model parameters based on similarities between the trusted local model parameters and the trusted global model parameters, and updating the trusted global model parameters based on the trusted local model parameters and the weights of the trusted local model parameters.

A clustering-based adaptive robust collaborative learning apparatus is proposed according to an embodiment of the present disclosure, and includes:
  one or more processors;
  a memory storing instructions executable by the one or more processors;
  in which the one or more processors are configured to:
  obtain local models uploaded by a plurality of collaborative terminals and at least part of training data of the plurality of the collaborative terminals for training the local model, and train a trusted global model based on the at least part of the training data;
  perform, by taking trusted global model parameters of the trusted global model as a trust guidance, a clustering operation on each parameter dimension of the local models based on a predetermined optimal clustering algorithm respectively, and obtain trusted local models and trusted local model parameters of the trusted local models; and
  determine weights of the trusted local model parameters based on similarities between the trusted local model parameters and the trusted global model parameters, and update the trusted global model parameters based on the trusted local model parameters and the weights of the trusted local model parameters.

A non-transitory computer-readable storage medium having computer instructions stored thereon, in which the computer instructions are configured to cause a computer to execute the clustering-based adaptive robust collaborative learning method as mentioned above.

Additional aspects and advantages of the present disclosure will be set forth in part in the following description, and in part will become obvious from the following description, or may be learned by practice of the disclosure.

BRIEF DESCRIPTION OF THE DRAWINGS

The above and/or additional aspects and advantages of the present disclosure will become obvious and easy to understand from the following description of the embodiments in conjunction with the accompanying drawings.

DETAILED DESCRIPTION

Embodiments of the present disclosure are described in detail below, and examples of embodiments are illustrated in the accompanying drawings, in which the same or similar labels represent the same or similar elements or elements with the same or similar functions. The embodiments described below with reference to the drawings are exemplary, and are intended to explain the present disclosure and are not to be construed as a limitation of the present disclosure.

The following describes a clustering-based adaptive robust collaborative learning method and apparatus according to an embodiment of the present disclosure with reference to the accompanying drawings.

Figure 1:
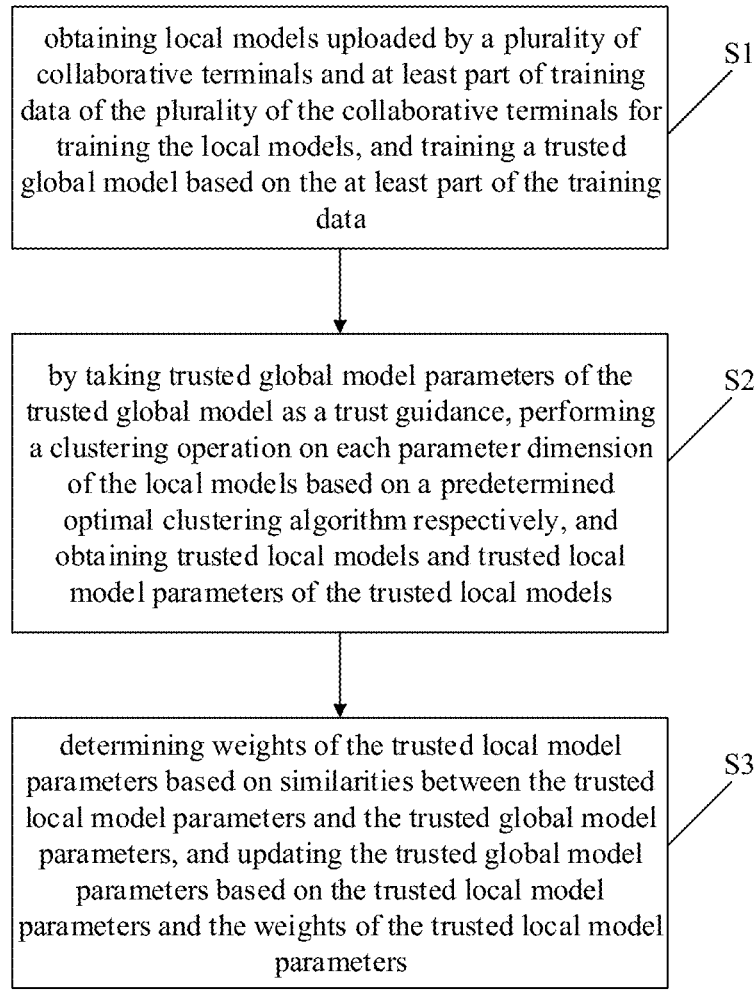
FIG. 1 is a flowchart of a clustering-based adaptive robust collaborative learning method according to an embodiment of the present disclosure.

FIG. 1 is a flowchart of a clustering-based adaptive robust collaborative learning method according to an embodiment of the present disclosure.

At block S1, local models uploaded by a plurality of collaborative terminals and at least part of training data of the plurality of the collaborative terminals for training the local models are obtained, a trusted global model is trained based on the at least part of the training data.

A central server (or a specific collaborator that initials an aggregation operation) trains the global model, and all collaborators train their local models respectively.

It can be understood that the central server (or the specific collaborator that initials the aggregation operation) collects a small set of data from each collaborator to ensure that the trusted global model of the central server (or the specific collaborator that initials the aggregation operation) is trained synchronously with the training of the collaborators. For example, the central server (or the specific collaborator that initials the aggregation operation) randomly collects 1% of the data of each collaborator.

As an example, the at least part of the training data may be checked, and training data whose check result is malicious information is removed from the at least part of the training data.

The central server (or the specific collaborator that initiates the aggregation operation) checks the collected data to determine that the data sent by each collaborator is data without malicious information (such as backdoor information).

Further, the central server (or the specific collaborator that initiates the aggregation operation) uses the collected data for training, and the obtained trusted global model is represented as $C_j^{(0)}$ (j=1, . . . , M), where M represents a total number of all the parameters of the model, and j represents a serial number of a parameter.

Further, each collaborator trains a local model with local data owned by itself in each round of training process, and sends a representation $C_j^{(i)}$ (j=1, . . . , M) of parameters of the local model to the central server (or the specific collaborator that initiates the aggregation operation) after the training is finished. $C_j^{(i)}$ represents the j-th parameter of the i-th collaborator, i∈[1,K]. M represents the total number of all the parameters of the model. K represents a total number of the collaborators. The local model sent by the collaborator adopts a parameter representation rather than a gradient representation.

At block S2, a clustering operation is performed on each parameter dimension of the local models based on a predetermined optimal clustering algorithm respectively by taking trusted global model parameters of the trusted global model as a trust guidance, and trusted local models and trusted local model parameters of the trusted local models are obtained.

The central server (or the specific collaborator that initiates the aggregation operation) selects the optimal clustering algorithm for a specific task and data by testing performance of clustering algorithms on a trusted dataset. Representation of the trusted global model parameters of the central server (or the specific collaborator that initiates the aggregation operation) is taken as the trust guidance, and the clustering operation is performed on each parameter dimension of the collaborator, to determine whether the model parameter of each dimension of the collaborator is trusted.

It can be understood that, in an embodiment of the present disclosure, for the local models $\{C_j^{(1)}$ (j=1, . . . , M), $C_j^{(2)}$ (j=1, . . . , M), . . . , $C_j^{(i)}$ (j=1, . . . , M), . . . , $C_j^{(K-1)}$ (j=1, . . . , M)$\}$, $C_j^{(K)}$ (j=1, . . . , M) of all the collaborators and the trusted global model $C_j^{(0)}$ (j=1, . . . , M) of the central server (or the specific collaborator that initiates the aggregation operation), the clustering operation X is performed on each parameter dimension j, a parameter of a local model of a collaborator that is divided into the same category with a parameter of the trusted global model of the central server (or the specific collaborator that initiates the aggregation operation) is determined as a trusted local model parameter. That is, for the j-th parameter, a clustering set where the j-th parameter $C_j^{(0)}$ of the trusted global model of the central server is located is denoted as a trusted parameter set $S_j^{trust}$, $C_j^{(0)} \in S_j^{trust}$. For the j-th parameter $C_j^{(i)}$ (j=1, . . . , M) of a local model of each collaborator, if $C_j^{(i)} \in S_j^{trust}$, it is determined that the j-th parameter $C_j^{(i)}$ of the i-th collaborator is trusted, otherwise it is untrusted.

A set of the trusted local model parameters on each parameter dimension is denoted as $S_j^{trust}$ (j=1, . . . , M).

Figure 2:
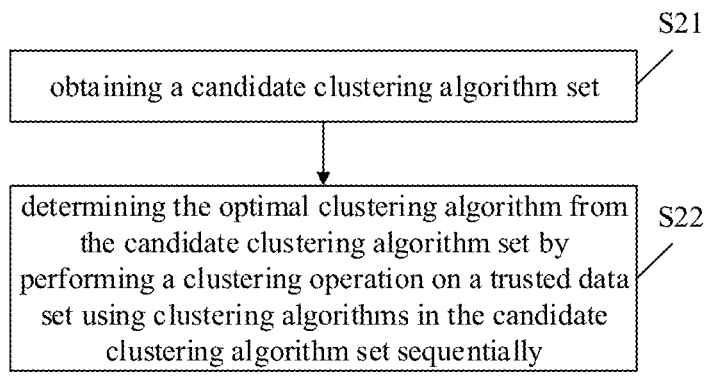
FIG. 2 is a flowchart of determining an optimal clustering algorithm by a clustering operation according to an embodiment of the present disclosure.

FIG. 2 is a flowchart of determining an optimal clustering algorithm through a clustering operation according to an embodiment of the present disclosure. As shown in FIG. 2, in the embodiment, before performing the clustering operation on each parameter dimension of the local models based on the predetermined optimal clustering algorithm respectively, the following blocks are included.

At block S21, a candidate clustering algorithm set is obtained.

It can be understood that the candidate clustering algorithm set is constructed based on known task information, data information, and parameters required by clustering algorithms. For example, common clustering algorithms may be K-Means clustering algorithm, a DBSCAN algorithm, an Agglomerative hierarchical clustering, a Divisive hierarchical clustering, and the like. The candidate clustering algorithm set is denoted as $U_{clu}$={K-Means, DBSCAN, Agglomerative, . . . }.

At block S22, the optimal clustering algorithm is determined from the candidate clustering algorithm set by performing a clustering operation on a trusted dataset using clustering algorithms in the candidate clustering algorithm set sequentially.

The central server (or the specific collaborator that initiates the aggregation operation) performs the clustering operation on the collected trusted dataset (composed of at least part of training data uploaded by all the collaborators) using the clustering algorithms in the candidate clustering algorithm set sequentially, and determines whether each category of the data determined by each clustering algorithm is correct. Which class to each category belongs is defined by a real category to which most data in the category belongs. For each clustering method, an accuracy rate Acc (x) for category determination may be calculated by:

$$Acc(x) = \frac{N_{true}}{N} \cdot 100\%$$

where, $x \in U_{clu}$, which represents a specific clustering algorithm. $N_{true}$ represents the number of samples whose category is correctly determined by the clustering algorithm x on the data of the central server (or the specific collaborator that initiates the aggregation operation), N represents the total number of data samples of the central server (or the specific collaborator that initiates the aggregation operation). A clustering algorithm with a maximum accuracy of category determination is denoted as X, which is used to determine whether the local model of each collaborator is trusted.

At block S3, weights of the trusted local model parameters are determined based on similarities between the trusted local model parameters and the trusted global model parameters, the trusted global model parameters are updated based on the trusted local model parameters and the weights of the trusted local model parameters.

The similarities between the trusted local models of trusted collaborators and the trusted global model of the central server (or the specific collaborator that initiates the aggregation operation) are used as indicators to assign different weights to the trusted local model parameters respectively, and then a trusted global model for the next round of training is obtained by a weighted summation.

Figure 3:
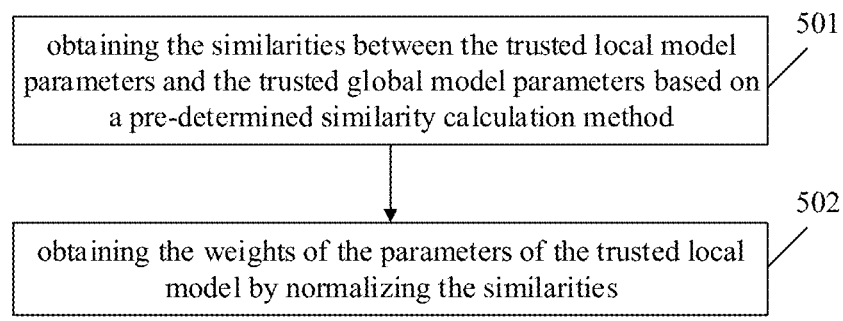
FIG. 3 is a flowchart of determining a weight of a trusted local model parameter according to a similarity according to an embodiment of the present disclosure.

FIG. 3 is a flowchart of determining the weights of the trusted local model parameters provided in an embodiment of the present disclosure. As shown in FIG. 3, in the embodiment, determining the weights of the trusted local model parameters based on the similarities between the trusted local model parameters and the trusted global model parameters includes the following blocks.

At block S31, the similarities between the trusted local model parameters and the trusted global model parameters are obtained based on a pre-determined similarity calculation method.

Specifically, a candidate set $U_{sim}$ of methods for calculating a similarity between parameters is constructed. The methods may include Euclidean distance, Manhattan distance, Chebyshev distance, etc., which are denoted as $U_{sim}$={Euclidean, Manhattan, Chebyshev, . . . }. A similarity measurement method selected for future usage by a user based on experience is denoted as g(•), namely g(•)∈ $U_{sim}$.

For each parameter dimension, a similarity between a trusted local model parameter $C_j^{(i)}$ and the j-th parameter $C_j^{(O)}$ of the trusted global model of the central server (or the specific collaborator that initiates the aggregation operation) is calculated by:

$W_j^{(i)}$=g($C_j^{(i)}$, $C_j^{(O)}$), ∀i∈[1,K], ∀j∈[1,M], where, $C_j^{(O)}$ represents the j-th parameter of the trusted global model of the central server (or the specific collaborator that initiates the aggregation operation), $C_j^{(i)}$ represents the j-th parameter of the local model of the i-th collaborator, $W_j^{(i)}$ represents a similarity between the j-th parameter of the local model of the i-th collaborator and the j-th parameter of the trusted global model of the central server (or the specific collaborator that initiates the aggregation operation), which is used as a basis for calculating the weights.

At block S32, the similarities are normalized to obtain the weights of the parameters of the trusted local model.

For the j-th parameter, j∈[1,M], the similarities $W_j^{(i)}$ of the local trusted models of all collaborators are normalized to obtain $W_j^{(i)*}$, so that a sum of the weights of all trusted local model parameters on the j-th parameter dimension is 1.

For j-th parameter, j∈[1,M], weighted average is performed on all the trusted local model parameters on this parameter dimension to obtain the j-th parameter of a trusted global model for the next round of training.

Thus, an updated trusted global model is distributed to all the collaborators and continues to perform from block S1 until the model converges or the number of rounds required for training is reached.

Further, after updating the parameters of the trusted global model based on the trusted local model parameters and the weights of the trusted local model parameters, it is determined whether a training termination condition is met. When the training termination condition is met, the trusted global model is distributed to the plurality of the collaborative terminals, and no training is further performed. When the training termination condition is not met, the trusted global model is distributed to the plurality of the collaborative terminals, and local training and model aggregation are continued.

Whether the model converges is determined by a change of a loss function or the number of training rounds, so as to determine whether to terminate the training of collaborative learning. For example, the training may be terminated when a value of the loss function is less than a preset L, or the training may be terminated when the number of the training rounds reaches a preset E.

In summary, the present disclosure may effectively adjust the aggregation method of the collaborative learning model for different tasks adaptively, accurately identify a potential local malicious model or a malicious collaborator in the collaborative learning process, and ensure robustness of the collaborative learning in a model training stage. Compared with the collaborative learning aggregation methods in the related art, the method improves the aggregation method from three aspects: distinguishing element, distinguishing granularity and distinguishing method. In terms of the distinguishing element, the model parameters themselves are used instead of the gradients corresponding to the parameters, because the parameters themselves accumulate the previous gradient information and have a more obvious and stable distinguishing effect on distinguishing the benign models from the malicious models. In terms of the distinguishing granularity, for each parameter of the model, a distinguishing method is used to determine whether the parameter serves a benign model or a malicious model. The reason is as follows: even in a malicious model, not every model parameter carries malicious information. For example, an embedding layer parameter and some bias parameters of a malicious model for text recognition still serve the benign model. Therefore, the distinguishing granularity is set to make maximum utilization of benign information of each parameter while ensuring the correct distinction of each parameter. In terms of the distinguishing method, a plurality of clustering algorithms are used to form the candidate clustering algorithm set, so that different clustering algorithms may be selected for different tasks, to achieve adaptive ability for specific tasks. In addition, using the clustering algorithms to distinguish the benign models from the malicious models is more flexible than the previous way that is based on distance calculation. Through the above three points, the adaptive robust collaborative learning aggregation method for tasks is realized, which can accurately distinguish the benign models from the malicious models in the collaborative learning process, and prevent one or several local malicious models from performing malicious attacks on the global model and the local benign models of other benign collaborators, which comprehensively improves the robustness of collaborative learning.

In summary, the present disclosure has the following beneficial effects.

In the application of collaborative learning, due to the privacy protection, the central server (or the specific collaborator that initiates the aggregation operation) cannot monitor the training data and the training process of each collaborator, which gives some malicious collaborators an opportunity to exploit. The malicious collaborators may generate malicious behaviors by directly participating in the collaborative learning training process or controlling the benign collaborators to generate malicious behavior during the training process to make the global model unavailable or have a specific backdoor, which threatens availability of the global model. The robust collaborative learning methods in the related art merge update gradients of the model into a one-dimensional vector, and determine whether the local model of the collaborator is involved in the aggregation process by calculating a distance. The aggregation method in the related art has a fixed process and cannot be adaptively changed based on different tasks, resulting in unstable performance on different tasks. In addition, the robust aggregation method in the related art merges all the parameters into a one-dimensional vector. Even in the local malicious model of malicious collaborators, not every parameter contains the malicious information. Therefore, the way of merging the one-dimensional vector and then uniformly determining whether the local model of the collaborator is a malicious model in the related art may affect the determination results.

According to the clustering-based adaptive robust collaborative learning method of the embodiment of the present disclosure, the benign model and the malicious model can be accurately distinguished in the collaborative learning process, and one or several local malicious models are prevented from performing malicious attacks on the global model and the local benign models of other benign collaborators, which comprehensively improves the robustness of the collaborative learning.

A clustering-based adaptive robust collaborative learning apparatus proposed according to an embodiment of the present disclosure is described with reference to the accompanying drawings.

Figure 4:
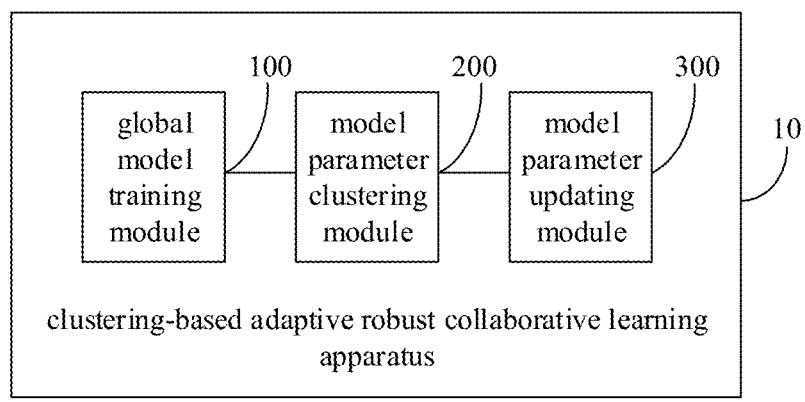
FIG. 4 is a block diagram of a clustering-based adaptive robust collaborative learning apparatus according to an embodiment of the present disclosure.

FIG. 4 is a structural diagram of a clustering-based adaptive robust collaborative learning apparatus according to the embodiment of the present disclosure.

As shown in FIG. 4, the apparatus 10 includes a global model training module 100, a model parameter clustering module 200 and a model parameter updating module 300.

The global model training module 100 is configured to obtain local models uploaded by a plurality of collaborative terminals and at least part of training data of the plurality of collaborative terminals for training the local models, and train a trusted global model based on the at least part of the training data.

The model parameter clustering module 200 is configured to perform, by taking trusted global model parameters of the trusted global model as a trust guidance, a clustering operation on each parameter dimension of the local models based on a predetermined optimal clustering algorithm respectively, and obtain trusted local models and trusted local model parameters of the trusted local models.

The model parameter updating module 300 is configured to determine weights of the trusted local model parameters based on similarities between the trusted local model parameters and the trusted global model parameters, and update the trusted global model parameters based on the trusted local model parameters and the weights of the trusted local model parameters.

Further, the above global model training module 100 is further configured to check the at least part of the training data, and remove the training data whose check result is malicious information from the at least part of the training data.

Further, the above model parameter clustering module 200 is configured to obtain a candidate clustering algorithm set, and determine the optimal clustering algorithm from the candidate clustering algorithm set by performing a clustering operation on a trusted dataset using the clustering algorithm in the candidate clustering algorithm set sequentially.

Figure 5:
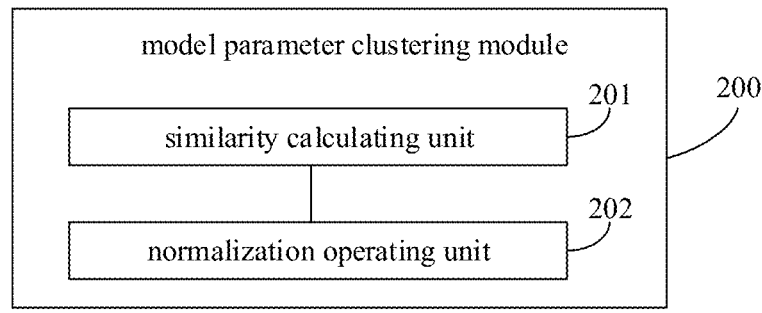
FIG. 5 is a block diagram of a model parameter clustering module according to an embodiment of the present disclosure.

Further, as shown in FIG. 5, the model parameter clustering module 200 includes a similarity calculating unit 201 and a normalization operating unit 202.

The similarity calculating unit 201 is configured to obtain the similarities between the trusted local model parameters and the trusted global model parameters based on a predetermined similarity calculation method.

The normalization operating unit 202 is configured to normalize the similarities to obtain the weights of the parameters of the trusted local model.

Further, the above model parameter updating module 300 is configured to determine whether a training termination condition is met, distribute the trusted global model to the plurality of collaborative terminals and stop the training when the training termination condition is met, distribute the trusted global model the plurality of collaborative terminals and continue local training and model aggregation when the training termination condition is not met.

Further, the training termination condition includes any one of: a loss function value of the trusted global model being less than a preset loss function threshold; or the number of training rounds reaching a preset round number.

According to the clustering-based adaptive robust collaborative learning apparatus of the embodiment of the present disclosure, the benign models and the malicious models can be accurately distinguished in the collaborative learning process, and one or several local malicious models are prevented from performing malicious attacks on the global model and the local benign models of other benign collaborators, which comprehensively improves the robustness of the collaborative learning.

It needs to be noted that the foregoing explanation of the embodiments of a clustering-based adaptive robust collaborative learning method may also be applied to the clustering-based adaptive robust collaborative learning apparatus in this embodiment, which will not be repeated here.

In addition, the terms "first" and "second" used in the present disclosure are only for description purpose, and may not be understood as indicating or implying relative importance or implying the number of technical features indicated. Therefore, features defined with "first" and "second" may explicitly or implicitly include at least one of the features. In the description of the present disclosure, "a plurality of" means at least two, for example two, three, etc., unless otherwise specified.

In the disclosure, descriptions with reference to terms "one embodiment", "some embodiments", "example", "specific example" or "some examples" mean that a specific feature, structure, material or characteristic described in connection with the embodiment or example is included in at least one embodiment or example of the present disclosure. In this specification, the schematic representations of the above terms do not necessarily refer to the same embodiment or example. Moreover, specific features, structures, materials or features described may be combined in one or more embodiments or examples in any suitable manner. In addition, those skilled in the art may combine different embodiments or examples or characteristics of different embodiments or examples described in this specification without contradicting each other.

It should be understood that, notwithstanding the embodiments of the present disclosure are shown and described above, the above embodiments are exemplary and shall not be construed as a limitation of the present disclosure. Those skilled in the art may make changes, alternatives, and modifications in the above embodiments within the scope of the present disclosure.

What is claimed is:

1. A clustering-based adaptive robust collaborative learning method, comprising:
obtaining local models uploaded by a plurality of collaborative terminals and at least part of training data of the plurality of collaborative terminals for training the local models, checking the at least part of the training data, removing training data whose check result is malicious information from the at least part of the training data, and training a trusted global model based on the at least part of the training data, wherein the at least part of the training data is randomly collected;
obtaining a candidate clustering algorithm set;
determining an optimal clustering algorithm from the candidate clustering algorithm set by performing a clustering operation on a trusted dataset using clustering algorithms in the candidate clustering algorithm set sequentially;
performing, by taking trusted global model parameters of the trusted global model as a trust guidance, a clustering operation on each parameter dimension of the local models based on the optimal clustering algorithm respectively, and obtaining trusted local models and trusted local model parameters of the trusted local models; and
determining weights of the trusted local model parameters based on similarities between the trusted local model parameters and the trusted global model parameters, and updating the trusted global model parameters based on the trusted local model parameters and the weights of the trusted local model parameters;
wherein determining the weights of the trusted local model parameters comprises:
obtaining the similarities between the trusted local model parameters and the trusted global model parameters based on a pre-determined similarity calculation method; and
obtaining the weights of the trusted local model parameters by normalizing the similarities.

2. The method of claim 1, after updating the trusted global model parameters based on the trusted local model parameters and the weights of the trusted local model parameters, further comprising:
determining whether a training termination condition is met, in response to the training termination condition being met, distributing the trusted global model to the plurality of collaborative terminals, and stopping the training; in response to the training termination condition being not met, distributing the trusted global model to the plurality of collaborative terminals, and continuing local training and model aggregation.

3. The method of claim 2, wherein the training termination condition comprises any one of:
a loss function value of the trusted global model being less than a preset loss function threshold; or
a number of training round reaching a preset round number.

4. A clustering-based adaptive robust collaborative learning apparatus, comprising:
one or more processors;
a memory storing instructions executable by the one or more processors;
wherein the one or more processors are configured to:
obtain local models uploaded by a plurality of collaborative terminals and at least part of training data of the plurality of collaborative terminals for training the local model, check the at least part of the training data, remove training data whose check result is malicious information from the at least part of the training data, and train a trusted global model based on the at least part of the training data, wherein the at least part of the training data is randomly collected;
obtain a candidate clustering algorithm set;
determine an optimal clustering algorithm from the candidate clustering algorithm set by performing a clustering operation on a trusted dataset using clustering algorithms in the candidate clustering algorithm set sequentially;
perform, by taking trusted global model parameters of the trusted global model as a trust guidance, a clustering operation on each parameter dimension of the local models based on the optimal clustering algorithm respectively, and obtain trusted local models and trusted local model parameters of the trusted local models; and
determine weights of the trusted local model parameters based on similarities between the trusted local model parameters and the trusted global model parameters, and update the trusted global model parameters based on the trusted local model parameters and the weights of the trusted local model parameters;

wherein when determines the weights of the trusted local model parameters, the one or more processors are configured to:

obtain the similarities between the trusted local model parameters and the trusted global model parameters based on a pre-determined similarity calculation method; and obtain the weights of the trusted local model parameters by normalizing the similarities.

5. The apparatus of claim 4, wherein the one or more processors are further configured to determine whether a training termination condition is met, distribute the trusted global model to the plurality of collaborative terminals and stop the training, in response to the training termination condition being met; distribute the trusted global model to the plurality of collaborative terminals and continue local training and model aggregation, in response to the training termination condition being not met.

6. The apparatus of claim 5, wherein the training termination condition comprises any one of:

a loss function value of the trusted global model being less than a preset loss function threshold; or a number of training round reaching a preset round number.

7. A non-transitory computer-readable storage medium having computer instructions stored thereon, wherein the computer instructions are configured to cause a computer to execute a clustering-based adaptive robust collaborative learning method, and the method comprises:

obtaining local models uploaded by a plurality of collaborative terminals and at least part of training data of the plurality of collaborative terminals for training the local models, checking the at least part of the training data, removing training data whose check result is malicious information from the at least part of the training data, and training a trusted global model based on the at least part of the training data, wherein the at least part of the training data is randomly collected;

obtaining a candidate clustering algorithm set;

determining an optimal clustering algorithm from the candidate clustering algorithm set by performing a clustering operation on a trusted dataset using clustering algorithms in the candidate clustering algorithm set sequentially;

performing, by taking trusted global model parameters of the trusted global model as a trust guidance, a clustering operation on each parameter dimension of the local models based on the optimal clustering algorithm respectively, and obtaining trusted local models and trusted local model parameters of the trusted local models; and determining weights of the trusted local model parameters based on similarities between the trusted local model parameters and the trusted global model parameters, and updating the trusted global model parameters based on the trusted local model parameters and the weights of the trusted local model parameters;

wherein determining the weights of the trusted local model parameters comprises:

obtaining the similarities between the trusted local model parameters and the trusted global model parameters based on a pre-determined similarity calculation method; and obtaining the weights of the trusted local model parameters by normalizing the similarities.

8. The non-transitory computer-readable storage medium of claim 7, wherein after updating the trusted global model parameters based on the trusted local model parameters and the weights of the trusted local model parameters, the method further comprises:

determining whether a training termination condition is met, in response to the training termination condition being met, distributing the trusted global model to the plurality of collaborative terminals, and stopping the training; in response to the training termination condition being not met, distributing the trusted global model to the plurality of collaborative terminals, and continuing local training and model aggregation.

9. The non-transitory computer-readable storage medium of claim 8, wherein the training termination condition comprises any one of:

a loss function value of the trusted global model being less than a preset loss function threshold; or a number of training round reaching a preset round number.

* * * * *